May 6, 1969     M. E. RUSSENBERGER ET AL     3,442,120
SERVO VALVE CONTROLLED HYDRAULIC RESONANT MACHINE
Filed April 19, 1966

INVENTORS
MAX E. RUSSENBERGER
DENNIS H. ANDERSON
MARTIN M. GRAM
BY
Dugger Johnson & Westman
ATTORNEYS

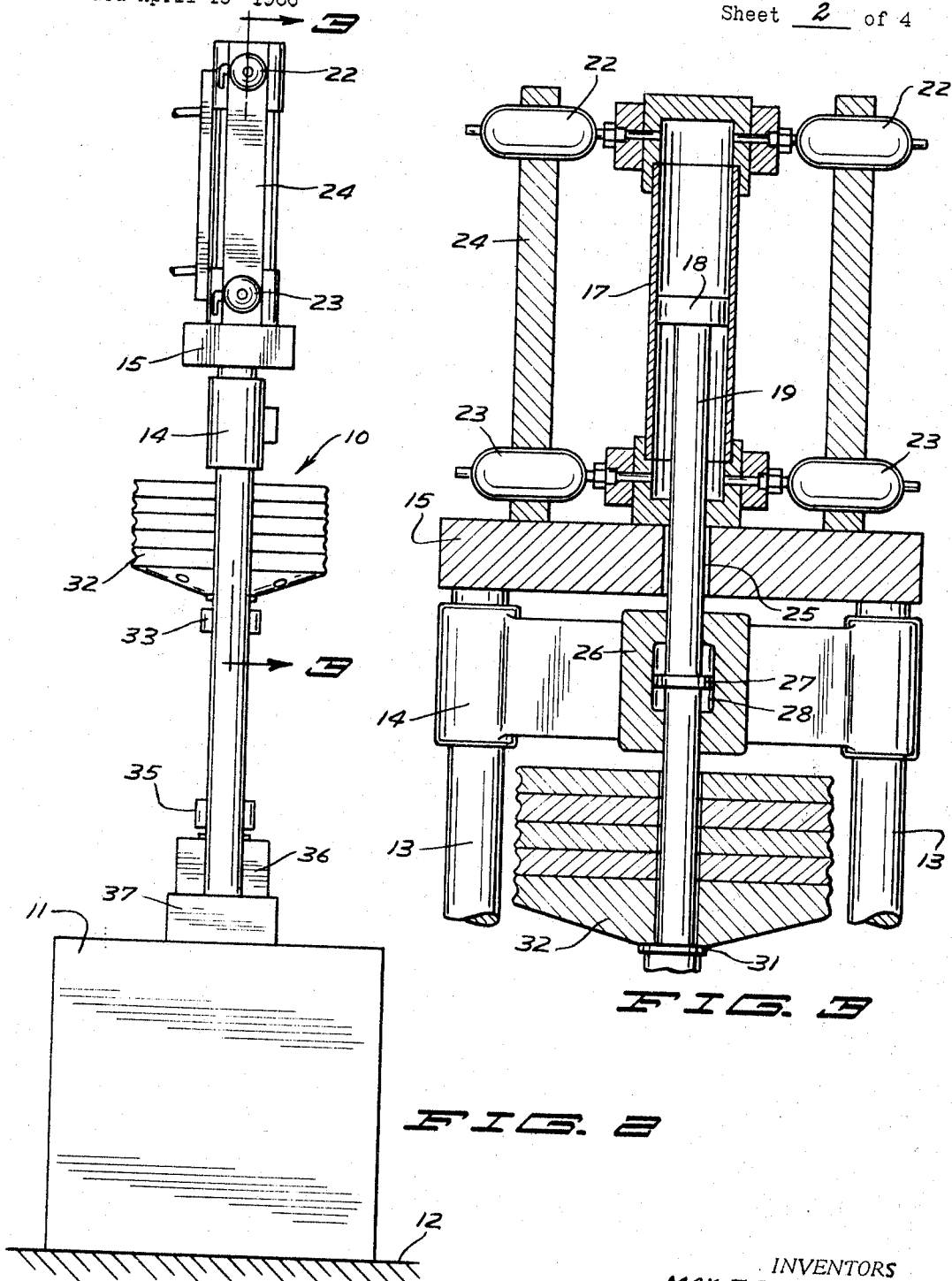

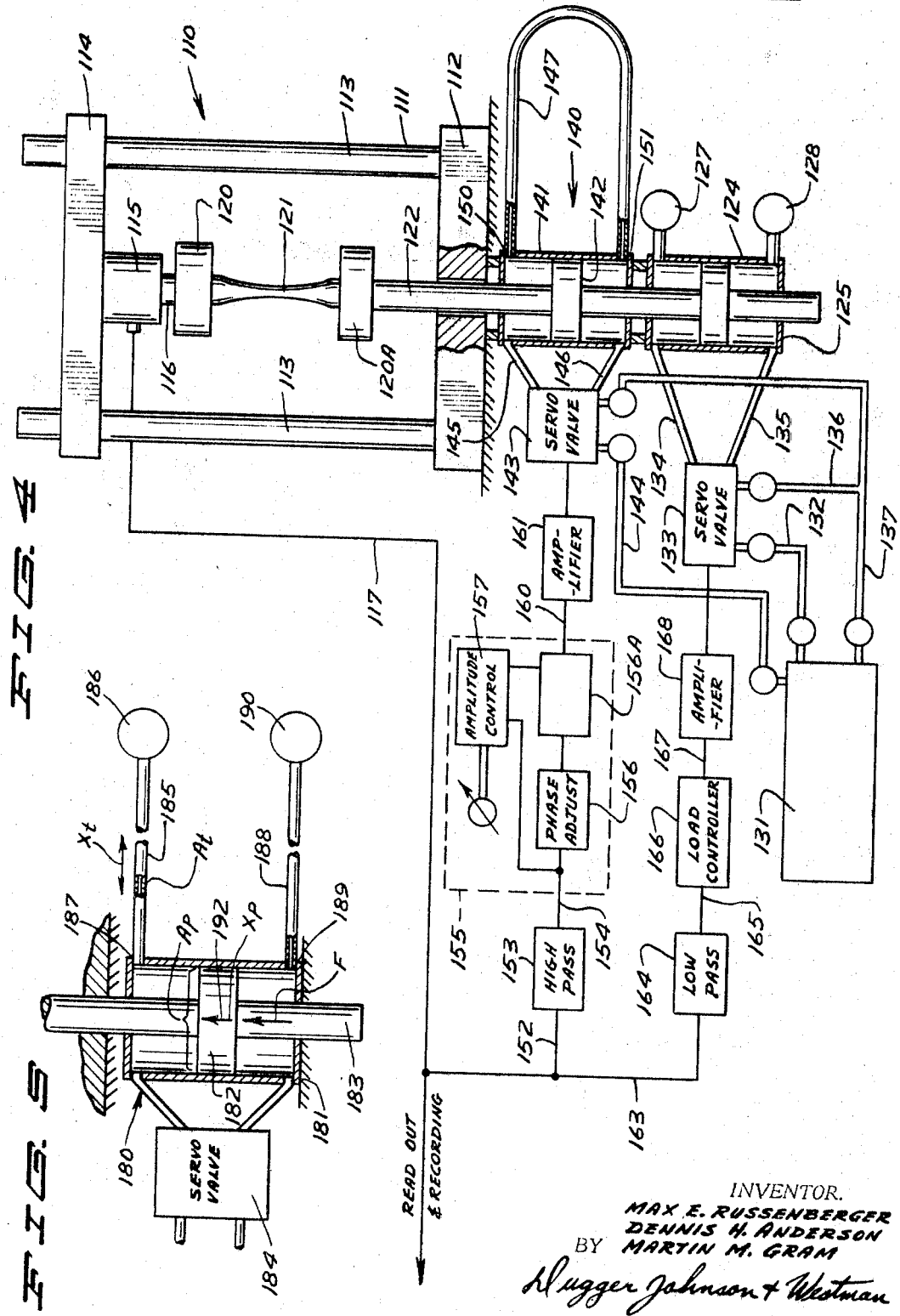

INVENTORS
MAX E. RUSSENBERGER
DENNIS H. ANDERSON
BY MARTIN M. GRAM

Dugger Johnson + Westman
ATTORNEYS 3,442,120
SERVO VALVE CONTROLLED HYDRAULIC RESONANT MACHINE
Max E. Russenberger, Schafthausen, Switzerland, and Dennis H. Anderson, Minnetonka, and Martin M. Gram, Bloomington, Minn., assignors, by mesne assignments, to MTS Systems Corporation, a corporation of Minnesota
Filed Apr. 19, 1966, Ser. No. 543,696
Int. Cl. G01n 3/32
U.S. Cl. 73—92      7 Claims

ABSTRACT OF THE DISCLOSURE

A fatigue test machine applying an oscillatory load on an elastic specimen with the natural frequency of the spring-mass system comprising the specimen in either external weights or a hydraulic mass equivalent. A servo valve is used for providing make up oil compensating for friction losses in the system and to insure the system will continue to resonate. The control circuitry provides adequate response so that the natural frequency of the spring-mass system can be maintained.

---

The present invention has relation to resonant fatigue testing machines and more particularly to fatigue testing machines which utilize servo controlled hydraulic devices for excitation.

The present device presents a fatigue test machine which applies an oscillatory load on a specimen at the natural frequency of a spring mass system and which uses a servo valve controlled hydraulic device for compensating for friction losses in the system to insure the system will continue to resonate and also, if desired, for applying a mean load on the specimen.

Two forms of the invnetion are shown. One, for higher frequency operation utilizing weights for obtaining the mass necessary for resonance and the other form utilizing moving hydraulic fluid in a cylinder-resonating tube arrangement for a mass equivalent. Both are servo valve controlled. In both, the major spring is provided by the specimen.

In many fatigue tests, low frequency cycling is desirable to get valid test results, especially for very large specimens. The higher the specimen spring rate, the higher the effective mass must be in order to keep the same resonant frequency. A large specimen usually has a high spring rate. It is these situations where the modification of the present invention, using mass equivalent moving hydraulic fluid, finds its greatest usage. The mass equivalent device is simple in physical construction and merely utilizes a tube of proper dimensions filled with hydraulic fluid and connected to a hydraulic cylinder which in turn is attached to the specimen being tested. The elastic specimen (usually a metal) acts as a spring and during elastic oscillation of the spring, the piston in the cylinder also moves back and forth. The fluid in the tube in particular is accelerated by movement of the piston back and forth. The fluid has to change directions of flow each time the spring and consequently the piston changes direction. This change of direction (the fluid slows and stops before changing direction) converts the kinetic energy of the moving fluid to elastic potential energy, in the specimen. Servo valves and other controls are provided to compensate for losses due to friction by adding more energy to insure the proper loads are maintained.

It is an object of the present invention to present a resonating fatigue test system which has a servo valve controlled hydraulic cylinder that is utilized for adding energy into the resonating system to compensate for friction losses, and which will add the energy at proper phase and frequency.

It is a further object of the present invention to present a resonating fatigue test system which has an independent hydraulic cylinder for applying a mean load to the system.

It is an object of the present invention to present a resonating fatigue test system utilizing hydraulic fluid to replace mass normally needed to obtain resonance at the desired frequency.

It is a further object of the present invention to present a fatigue testing machine using a resonating hydraulic fluid for replacing mass in combination with hydraulic controls to compensate for energy losses in the system.

Other objects are those inherent in the specification and will become apparent as the description proceeds.

In the drawings,

FIG. 2 is a side elevational view of the device of FIG. 1;

FIG. 3 is an enlarged vertical sectional view taken as on line 3—3 in FIG. 2;

FIG. 4 is a schematic representation of a modified fatigue testing machine and controls therefor utilizing a moving hydraulic fluid to provide an equivalent mass for obtaining low natural frequencies of operation;

FIG. 5 is a schematic representation of another form of the actuator that can be utilized with the machine of FIG. 4.

Figure 1:
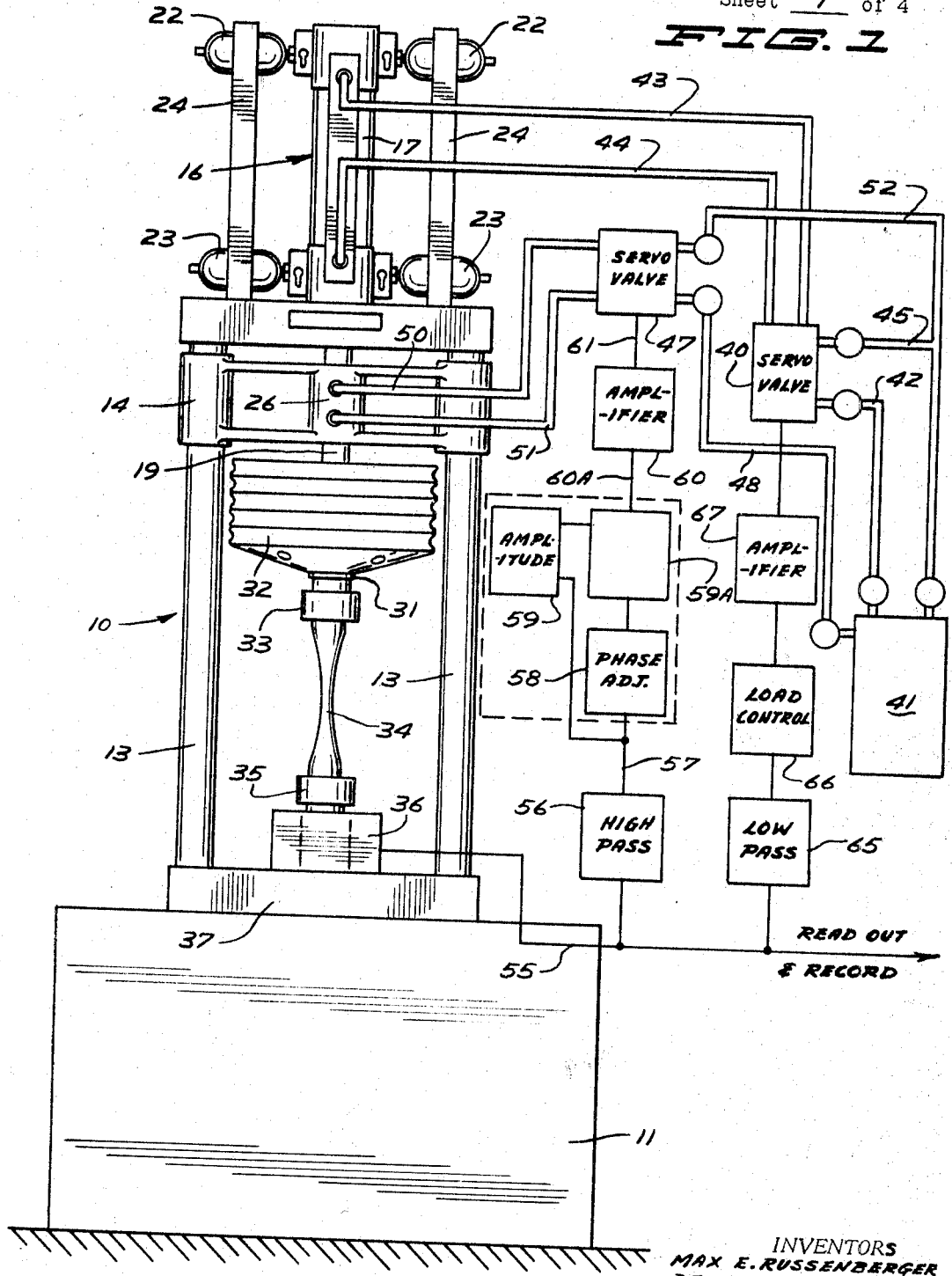
FIG. 1 is a front elevational view of a fatigue testing machine made according to a first form of the present invention.

Referring to the drawings and the numerals of reference thereon, a testing machine illustrated generally at 10 includes a large concrete base 11, which can be mounted on vibration isolators to prevent transmission of vibrations through the floor 12. The base 11 is used to mount a pair of spaced apart upright columns 13, 13 on which, in turn, a crosshead 14 is vertically slidably mounted. The crosshead 14 can be locked in position through suitable locking devices (not shown) with respect to the column to prevent axial movement of the crosshead along the column. The locking devices are well known in the art, as is the load frame, which is a conventional unit.

A top crosshead 15 is also provided and this is in turn mounted on the top of the columns 13, 13. A large hydraulic cylinder 16 is mounted onto the top crosshead 15 and extends upwardly therefrom. As shown, the hydraulic cylinder 16 includes an outer cylinder member 17, an internal piston 18 and an outwardly extending downwardly depending rod 19. The rod is slidably mounted in sealing arrangement at the end of the cylinder adjacent to the top crosshead 15. A pair of first hydraulic accumulators 22 are open to the interior of the cylinder 17 adjacent to the upper end thereof and a pair of second hydraulic accumulators 23 are open to the interior of the hydraulic cylinder 17 adjacent to the second end thereof. The accumulators 22 and 23 are conventional units and are mounted in a suitable frame 24 which in turn is mounted onto the top crosshead 15.

The rod 19 extends downwardly through a provided opening 25 in the top crosshead 15 and also passes through a small actuator cylinder 26 which is a chamber formed in the center of the crosshead 14.

The rod 19 is sealingly slidably mounted through provided openings in this cylinder 26 and is not attached to the crosshead at all. A piston 27 is slidably mounted inside the interior chamber 28 of the cylinder 26 and is attached to the rod 19. This forms a hydraulic cylinder-piston assembly.

Adjacent to the lower end of the rod 19 a shoulder or ring 31 is provided, and a plurality of weights 32 are mounted over the rod above the ring 31. Suitable means are provided for replacing and removing weights, and as shown, several different weights can be utilized to achieve the desired mass for operation. The openings in the weights could be slotted, for attachment, or the ring 31 and the lower portions of the rod can be removably attached so the weights can be inserted over the end of the rod. The weights would be securely fastened together to rod 19.

A specimen grip 33 is suitably attached to the end portion of the rod 19 and is used for gripping a specimen 34 to be tested. The lower end of the specimen is attached to the second specimen grip 35. The second specimen grip 35 is attached to a load cell or transducer 36 which in turn is attached to a cross member 37 mounted on the base 12. The load cell 36 is of a conventional design usually utilizing strain gages for determining load and is electrically excited. The load cell will give an electrical signal proportional to the load thereon.

The large cylinder assembly 17 is used for applying a preload or mean load on the specimen 34. Hydraulic fluid under pressure flowing to cylinder assembly 16 is controlled by a servo valve 40. A pressure source 41 supplies fluid under pressure through a line 42 to the servo valve and depending upon the valve condition, fluid under pressure will go either through line 43 or line 44 to the cylinder, then through suitable internal conduits it will be directed to the proper chamber of the cylinder against the proper side of the piston to get the direction of force necessary for the mean load. A return line 45 leads from the servo valve 40 back to a reservoir in the hydraulic source 41. The accumulators are used to make this cylinder act as a soft spring. The piston then can move slightly during oscillation.

The small cylinder assembly 26 in the crosshead 14 is supplied with fluid under pressure from a servo valve 47. A line 48 extends from the source of fluid under pressure to the servo valve 47 and lines 50 and 51 extend from the servo valve to ports leading to opposite sides of the piston within the chamber 28. A return line 52 joins return line 45 and provides flow from the servo valve 47 back to the reservoir of the hydraulic pressure source 41.

A fatigue test system as shown is of the resonating spring-mass type. Sufficient weights are added so that the natural frequency of the spring-mass system is in the desired range. As shown, the usual range of operation of the type of system disclosed will be in the neighborhood of 60–300 cycles per second. The external weights at this frequency range do not have to be excessively large. The primary springs are the specimen 34 and load cell 36, although the mean load actuator and accumulator assembly adds some spring action. The natural frequency of the system can be defined by the formula:

$$F_n = \frac{1}{2\pi}\sqrt{\frac{K}{M}}$$

where K is the overall spring constant and M is mass.

Once the unit attains resonance, neglecting friction losses, it will continue to oscillate at his natural frequency. However, due to internal friction losses, hydraulic friction losses and other losses in the system, it is necessary to compensate by putting in some energy to maintain resonance. This is accomplished through the use of hydraulic power controlled as shown. The controls include a load cell 36 which provides signals to control the device through proper circuitry. The load cell or transducer 36 puts out an electrical signal proportional to the load on it, and the signal will vary directly proportional to the fluctuations in load. Therefore, in a resonating fatigue system, which has a sinusoidal load pattern, the load cell will have an output signal which is also sinusoidal. This will indicate the direction of load on the specimen as well as the amplitude of the load. In addition, if a mean load is applied through the upper cylinder assembly 16, the load cell will put out a steady state electrical signal indicating the magnitude of this load. Thus there will be a fluctuating signal on top of the steady state signal.

This electrical signal is carried through a line 55. The line 55 is connected to a high pass filter 56 which will permit the high frequency signal, or the sinusoidal signal to pass into a line 57. This in turn will enter a phase adjustment device 58 and also enter an amplitude control device 59.

The phase adjustment and amplitude control device are combined in a commercially available unit. A Model 421.10 unit sold under the trademark AMPAC by MTS Division of Research, Incorporated, Eden Prairie, Minn., works satisfactorily. If desired, a Model 421.03 unit can be used with the addition of a phase adjustment circuit. The components in the unit are enclosed in dotted lines in FIG. 1.

The amplitude control has been previously set either automatically by a preprogrammer, or manually (by a device shown schematically) so that the desired amplitude on the specimen will be achieved. The amplitude of the load or force is usually the controlled function. The amplitude controller 59 will compare the load amplitude indicated by the signal coming from the load cell 36 on line 57 with the preprogrammed signal, and if it is not at the same level, the controller will increase or decrease the output accordingly. The phase of the signal coming through the line 57 will enter the phase adjustment device and the phase of the output signal from the controller will be manually shifted until the output generated by the amplitude controller will be at a minimum. This adjustment is made to obtain maximum efficiency, or in other words, to reduce external power being supplied to a minimum. The output of the amplitude controller receives the phase correction at 59A and will pass through a line 60A to an amplifier 60. The output signal from the amplifier will be directed to servo valve 47 through line 61. The servo valve will then be actuated to direct fluid under pressure from the source 41 to either line 50 or 51 depending upon the amplitude and phase of the signal from the amplifier 60. The servo valve will direct the fluid at proper flow amplitude and in phase to compensate for frictional losses and maintain the systems resonance. Servo valves are extremely sensitive and will operate at high frequency.

At the same time, the mean value of the load cell signal will go through the low pass filter 65 into a servo controller 66, for example, a Model 401.01 controller made by the MTS Division of Research, Incorporated, Eden Prairie, Minn., and sold under the trademark SERVAC. The servo controller will be set by preprogramming the device automatically or manually so that a desired mean load will be maintained on the specimen. If correction of this desired mean load is necessary, the differential signal will be amplified through amplifier 67 and thus to servo valve 40 which will open to make the proper correction. Fluid under pressure will be directed to the cylinder to either increase or decrease the load as necessary.

In FIGS. 4 and 5, a resonant fatigue testing system is illustrated generally and schematically at 110. The fatigue testing system is shown schematically because the actual components utilized are standard components available on the market. The system comprises a load frame 111 which is mounted on a foundation 112 that is of substantial size. The base 112 comprises a large steel structure usually isolated from the floor for vibration in some manner. The frame has a plurality of upright support columns 113, 113 on which a crosshead 114 is mounted. The crosshead 114 can be mounted so that it is movable up and down along the columns and has suitable means for locking it with respect to the column so that it can be maintained in a fixed position.

The crosshead 114 is used to mount a load cell 115 which depends downwardly therefrom. The load cell is a conventional purchased unit which measures the load on an element 116 and delivers an electrical signal through a line 117 which indicates the amount of load being placed on the load cell. It is apparent, of course, that the signal on line 117 will vary with the changes in load substantially instantaneously and will give a signal indicating the direction of force or load application. Suitable electrical means are used to excite the load cell 115 and these are not shown. Strain gage load cells giving very high responses are well known. The element 116 is used to mount a specimen grip 120. The grip can be one that is readily available on the market and adapted to suit the different types of specimens used. As shown, the grip is used to mount a specimen 121 which is made of steel or similar elastic material. A bottom specimen grip 120A is also utilized for gripping the bottom portions of the specimen. The bottom grip member 120A is attached to a rod 122 attached to a pair of load actuators illustrated generally at 123. The load actuators are hydraulic cylinder-piston assemblies which are suitably fastened with respect to the base 112. Each of the actuators has an internal piston that is attached to the rod 122. As shown, there is a mean load actuator 124 which comprises a hydraulic cylinder 125 and internal piston 126. The hydraulic cylinder 125 and piston 126 are double acting, in other words they will exert force on either direction of movement along the axis of rod 122 depending on the internal pressure. The piston 126 is attached to the rod 122 and suitable sealing means are provided to prevent leakage around the rod where it passes through the end wall to the cylinder. A hydraulic accumulator 127 is open to the interior of the cylinder 125 on a first side of piston 126 and a hydraulic accumulator 128 is open to the interior of the cylinder 125 on the second side of the piston 126. The accumulators are conventional units used all the time in hydraulics.

The actuators 123 are provided with fluid under pressure from a pressure source 131. A pressure line 132 extends from pressure source 131 to a servo valve 133 which in turn is electrically controlled and will, when receiving a proper electrical signal, direcs pressure into a line 134 or to a second line 135 and thus into the interior of the cylinder 125 to give the proper direction of force on piston 126 and consequently rod 122.

The servo valve is a commercially available unit operating in response to an electrical signal to open and close the internal valves to direct the fluid under pressure properly. A return line 136 extends from the valve 133 back into a common return 137 that leads back to reservoir on the pressure source 131.

A dynamic load actuator illustrated generally and schematically at 140 comprises an outer cylinder 141 having an internal piston 142 sealably slidably mounted therein. The piston 142 is fixedly attached to the rod 122 and moves with the rod.

A servo valve 143 is utilized for controlling flow of fluid under pressure into the interior of the cylinder 141. A line 144 extends from the pressure source 131 to the servo valve 143 and pressure lines 145 and 146 extend from the servo valve into the interior of the cylinder 141 on opposite sides of the piston 142. Return line 137 is also connected to the servo valve 143 for operating the dynamic load actuator.

In the dynamic load actuator, a thin walled hollow tube 147 is open to the interior of the cylinder 141 as at 150 adjacent a first end thereof and forms a continuous complete loop and is also open to the cylinder 141 as at 151 adjacent the second end thereof as well. The tube 147 is filled with hydraulic fluid and will be termed the resonant tube. As can be seen, there is no obstruction for fluid flow between the two sides of the piston 142 through the tube 147. The tube 147 is hollow and the diameter and length are selected to give the proper action to the system.

Controls for the system utilize the signals coming from line 117 of the load cell through proper instrumentation to control the servo valves. The alternating signal from the load cell passes through a line 152 to a high pass filter 153 (it lets higher frequency signals pass) and then into a line 154. This in turn will enter a phase adjustment device 156 and also enter an amplitude control device 157, which is the same as in the first form of the invention.

The amplitude control has been previously set either automatically by a preprogrammer, or manually (by a device shown schematically) so that the desired amplitude on the specimen will be achieved. The amplitude of the load or force is usually the controlled function. The amplitude controller 157 will compare the load amplitude indicated by the signal coming from the load cell 115 on line 154 with the preprogrammed signal, and if it is not at the same level the controller will increase or decrease the output accordingly. The phase of the signal coming from through the line 154 will enter the phase adjustment device 156 and the phase of the output signal from the controller will be manually shifted until the output generated by the amplitude controller will be at a minimum. This adjustment is made to obtain maximum efficiency, or in other words, to reduce external power being supplied to a minimum. The output of the amplitude controller receives the phase correction at 156A and will pass through a line 160 to an amplifier 161. The output signal from the amplifier will be directed to servo valve 143 through line 162. The servo valve will then be actuated to direct fluid under pressure from the source 131 to either line 145 or 146 depending upon the amplitude and phase of the signal from the amplifier 161. The servo valve will direct the fluid at proper flow amplitude and in phase to compensate for frictional losses and maintain the system's resonance. Servo valves are extremely sensitive and will operate at high frequency.

At the same time, the mean value of the load cell signal will go through a line 163 to the low pass filter 164 to a line 165 and then into a servo controller 166 (the same as 66 in the first form). The servo controller will be set by preprogramming the device automatically or manually so that a desired mean load will be maintained on the specimen. If correction of this desired mean load is necessary, the differential signal will be sent through line 167 and amplified through amplifier 168 and thus to servo valve 133 which will open to make the proper correction. Fluid under pressure will be directed to the cylinder 125 to either increase or decrease the load as necessary.

A further modified form of the invention is shown in FIG. 5. The dynamic load actuator 180 comprises a cylinder 181 and piston 182 connected to a rod 183 that corresponds to rod 122. A servo valve 184 is used to control fluid under pressure supplied to cylinder 181 in the same manner as before. However, in place of the tube 147, a first resonant tube 185 is open to the interior of the cylinder 181 adjacent a first end 187. The resonant tube has an accumulator 186 at the outer end thereof. A second resonant tube 188 is open to the cylinder 181 at a second end 189 and has an accumulator 190 at an outer end thereof.

This method permits application of mean and cyclic load with the same actuator.

The utilization of spring-mass resonant fatigue testing is well known. However, in all prior cases, the mass was present in the form of a large weight. A system utilizing this principle is shown in Patent No. 2,602,326 which relates to an automatic amplitude regulator for an oscillation test machine. In a simple spring-mass system the natural frequency or resonant frequency is expressed by the following equation:

$$F_n = \frac{1}{2\pi} \sqrt{\frac{K}{M}} \text{ c.p.s.}$$

where K is the spring factor and M is mass.

In small systems where the spring rate is low or where the operating frequency can be high, a relatively small mass is needed to produce a convenient natural frequency. Such a system is illustrated in the first form of the invention. As the specimen gets large (the specimen is actually the spring in this system) the spring rate usually increases and this requires a larger mass to maintain the same natural frequency. For larger specimens a lower natural frequency is normally required to avoid excessive heating and critical resonance in the specimen itself and also in the holding frame. For example, if a specimen has a stiffness of $10^7$ pounds per inch and a maximum tolerable operating frequency of 30 c.p.s., then the weight which would be needed is expressed by:

$$\left(\text{mass} = \frac{\text{weight}}{g}\right) w = \frac{gk}{(2\pi f_n)^2} = \frac{386 \times 10^7}{(2\pi \times 30)^2} = 11,000 \text{ lb.}$$

If the maximum tolerable frequency is 15 c.p.s., the required weight would be 44,000 pounds. It is easy to see that mechanical problems associated in vibrating this large a mass is very difficult. The necessity for testing large specimens is becoming increasingly important in the present technology because of the expanding use of high strength material.

The device of the present invention is advanced to eliminate the necessity for using the high weights which are indicated by the foregoing formulas. The principle is basically to produce a very large effective mass by accelerating hydraulic fluid in a small tube, for example tube 147 in FIG. 4. The principle can perhaps best be explained by referring to FIG. 5 and assuming an incompressible fluid (most hydraulic fluids are slightly compressible) in the cylinder 181 and tube 185. The lower half of the cylinder and the tube 188 are neglected to make this explanation simpler. The length of the tube is "L" and its internal area is illustrated as $A_t$. The amplitude of displacement or amount of movement of the hydraulic fluid in the tube is indicated by $X_t$. The area of the piston 182 acting on that particular tube is $A_p$; the amplitude of the distance moved by the piston indicated by the arrow 192 is $X_p$ and the force on the piston is indicated as F.

Displacement for a resonating system can be defined as:

$$x = X \sin(\omega t)$$

where X is the amplitude.

The pressure amplitude in the tube, $P_t$, required to cycle the mass of fluid in the tube at a displacement amplitude of $X_t$ (assuming that the accumulator is large enough so the pressure remains almost constant) is given by:

$$P_t = \frac{w}{g} L \omega^2 X_t$$

where:

$w$ = Fluid density, lb./in.$^3$
$g$ = 386 in./sec.$^2$
$\omega$ = Frequency of oscillation, rad./sec.

The force amplitude on the piston 182 is given by:

$$F = P_p A_p$$

Where:

$P_p$ = Pressure amplitude on piston, p.s.i.
$A_p$ = Piston area

The mass this force can accelerate at amplitude, $X_p$, and frequency, $\omega$, represents the equivalent mass simulated in the small tube. Therefore from this classic equation $M = F/a$, this mass is given by:

$$M = \frac{P_p A_p}{X_p \omega^2}$$

where:

$X_p$ = The displacement amplitude of the piston

Since $P_p = P_t$, from Equation 2

$$M = \frac{w}{g} L A_p \frac{X_t}{X_p}$$

and since $$\frac{X_t}{X_p} = \frac{A_p}{A_t}$$

$$M = \frac{w}{g} L A_p^2 / A_t$$

The magnitude of this effect is readily illustrated by assuming an actuator with a piston area ($A_p$) of 170 in.$^2$, a 2.5 inch diameter tube 20 feet long and using a mineral oil having density of 0.03 lb./in.$^3$. The equivalent mass weight is then:

$$W = Mg = \frac{(.03)(240)(170)^2}{\frac{\pi}{4}(2.5)^2} = 42,300 \text{ lb.}$$

The calculations shown are an indication of the magnitude of the mass multiplication effect achieved by accelerating the fluid in a resonant tube at a higher amplitude than the piston is accelerated. Compensations for the fluid compressibility and friction losses in the tube and cylinder can be made. These losses will make it necessary to vary the diameter and lengths of the tube slightly, but will not change the basic theory behind the operation.

The use of two tubes on a double acting cylinder—tubes 185 and 188 as shown in FIG. 5—doubles the effective mass and allows operation in both tension and compression.

The servo valve 184 in FIG. 5 acts to flow oil into and out of the actuator in phase with the pressure fluctuations it flows fluid into the side where the pressure is high. This adds energy to the system and tends to keep it resonating by compensating for the friction losses. The servo valve additionally is controlled to maintain a differential mean pressure on each side of the actuator which causes a mean load on the specimen. The control scheme is the same as was previously described, except both the cyclic and the mean load command signals are summed to drive the single servo valve.

Oil flowing in the tube 185 of FIG. 5 flows in equal volume and opposite direction of the flow in tube 188, so neglecting the mean load it obviously is possible to remove the accumulators and connect the two tubes together to achieve the same effect. FIG. 4 shows this scheme. Tube 147 replaces the tubes and accumulators of FIG. 5, and a second cylinder 124 is added to apply the mean load to the specimen.

In the example of FIG. 4, the same analysis of the oscillating fluid holds true. The tube 147 is hollow and fluid will flow in the tube whenever the piston 142 moves during oscillation or vibration of the specimen-equivalent mass system at its natural frequency. As stated previously, the specimen 121 acts like a spring and when oscillating at its natural frequency a sinusoidal function will be generated. In other words, the piston 142 will alternately move up and down. When the piston is at the peak of the sine function, after moving its maximum distance downward, all the energy in the system has been stored as potential energy elastically deflecting the specimen. The spring force of the specimen starts moving the actuator upward, converting the potential energy in the specimen to kinetic energy in the piston and, thus, in the fluid in the tube. At the maximum velocity point (the mean position on the sine function) all of the elastic energy of the specimen (assuming a zero mean load) has been transferred into kinetic energy of the piston 142 and fluid in tube 147. As the piston continues upward in compression (assuming a zero mean load) the kinetic energy transfers back into stressing the specimen elastically in compression until all the kinetic energy is back into the specimen as potential energy. The cycling continues as long as outside energy is supplied through the servo valve to compensate for friction losses in the system.

The amount of outside energy is determined and controlled by the controls previously explained, operated in response to a signal from the load cell. The phase of operation is adjusted to obtain maximum efficiency.

The movement of the piston 142 and rod 122 up and down will also move the piston 126 up and down. This is permitted by the use of the accumulators 127 and 128 which will permit the fluid in the cylinder 124 to flow sufficiently so that the piston 126 can move without substantially changing the pressure within the cylinder and thus not substantially changing the mean load. Again, the mean load, if one is desired, can be preset and will be maintained by the load controller 166 acting through the servo valve 133.

The form of the invention in FIG. 5 permits the application of a mean load and a pulsating load using the equivalent mass hydraulic fluid with a single actuator. In other words, the pressure on opposite sides of the piston 182 can be different, if desired, and yet the oscillating loads can still be achieved. The pressures in the accumulators 186 and 190 would thus be different as well, but the fluid which would be accelerated in the tube 185 when the piston 182 moves upwardly would be momentarily stored in the accumulator and when the piston 182 reverses direction, the fluid would reverse its flow in tube 185 as the kinetic energy of the fluid is transferred by the piston 181 to potential energy in the specimen. This is true even if the mean pressure is different on one side of the piston from the other.

The servo valve 184 would operate exactly like the servo valve 143 and use the same instrumentation, except that the mean load command signal and the cyclic load command signal would be summed and used to drive the single servo valve.

The actual selection of the tube size for the resonant tubes, as they will be termed in this application, depends on the type of liquid used, its compressibility and other factors which can be experimentally determined in order to achieve the proper relationship in the hydraulic fluid within the tube. In other words, the relationship has to be such that the equivalent mass is simulated in order to obtain resonance at the desired natural frequency.

It has been found that efficiency of the system can be increased by separating out the excitation or drynamic actuator portion of the resonating system from the accelerating fluid cylinder (mass equivalent cylinder). For example, referring to FIG. 6, a modified schematic representation of the system is shown. The rod 122 extends down into the cylinder 141 and has the piston 142 attached thereto as before. The resonant tube 147 is open to the cylinder 141 at points 150 and 151. The entire system is filled with hydraulic fluid. In place of the servo valve, however, a pressure regulator 200 is open to the interior of cylinder 141 on one side of the piston 142 and a pressure relief valve 201 which leads back to the reservoir (shown schematically) is open to the cylinder on the opposite side of the piston 142.

The pressure regulator and relief valve are used to maintain a predetermined pressure inside the resonating tube-cylinder assembly either by increasing or relieving pressure, as necessary.

The resonating fluid will flow in tube 147 exactly the same as explained before when the rod 122 moves up and down. However, there will be no introduction of fluid under pressure from the servo valve into this resonating tube-cylinder assembly.

The resonating tube-cylinder assembly shown strictly functions as mass replacement or equivalent.

The cylinder 124 for applying a mean load is also operated just exactly the same way as in FIG. 4 and includes the servo valve 135 for control of this mean load.

In order to provide a dynamic actuator to make up for losses in the system, a cylinder 203 is mounted with respect to the base of the unit and has an internal piston 204 which is fixedly attached to an extension of the rod 122. Servo valve 143 is connected through the lines 145 and 146 into the interior of the cylinder 203 and the servo valve receives its signal from the amplifier 161. The controls are exactly the same as they are in the embodiment shown in FIG. 4 with the exception that the cylinder 203 is separated from the resonating fluid cylinder. The load cell again provides the control signal.

Figure 6:
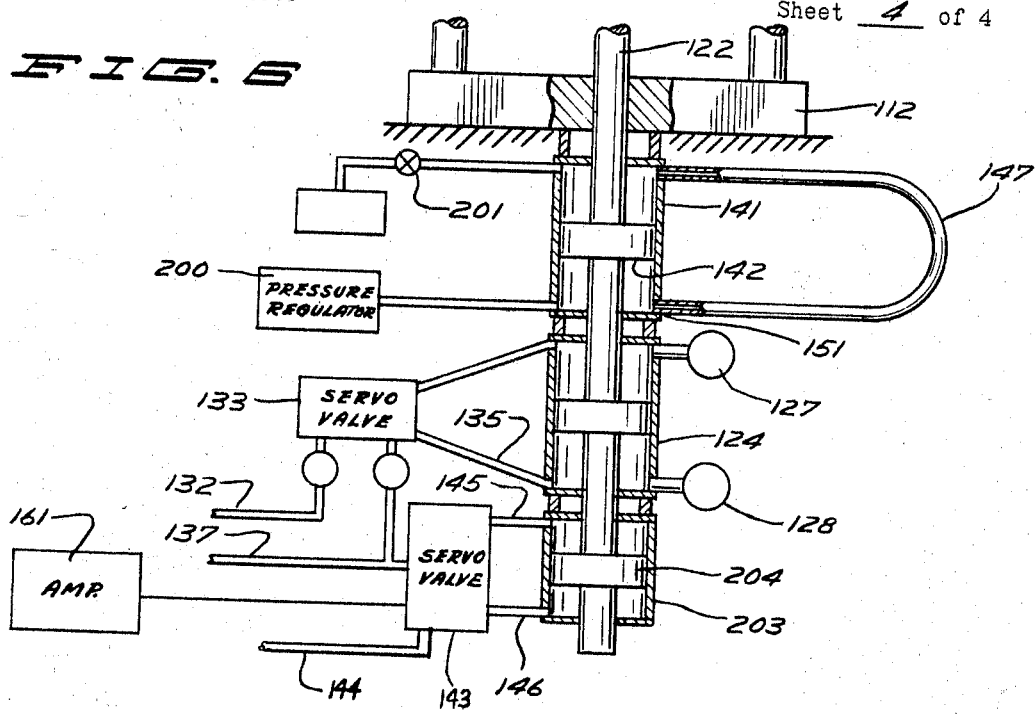
FIGS. 6 and 7 are schematic representations of still other arrangements of the invention, wherein the moving hydraulic fluid is used but the actuator cylinder is separate from the fluid cylinder.

Any losses are taken care of by actuation of the cylinder and piston 203–204. Thus the system of FIG. 6 is the mechanical equivalent of the system of FIG. 4.

Figure 7:
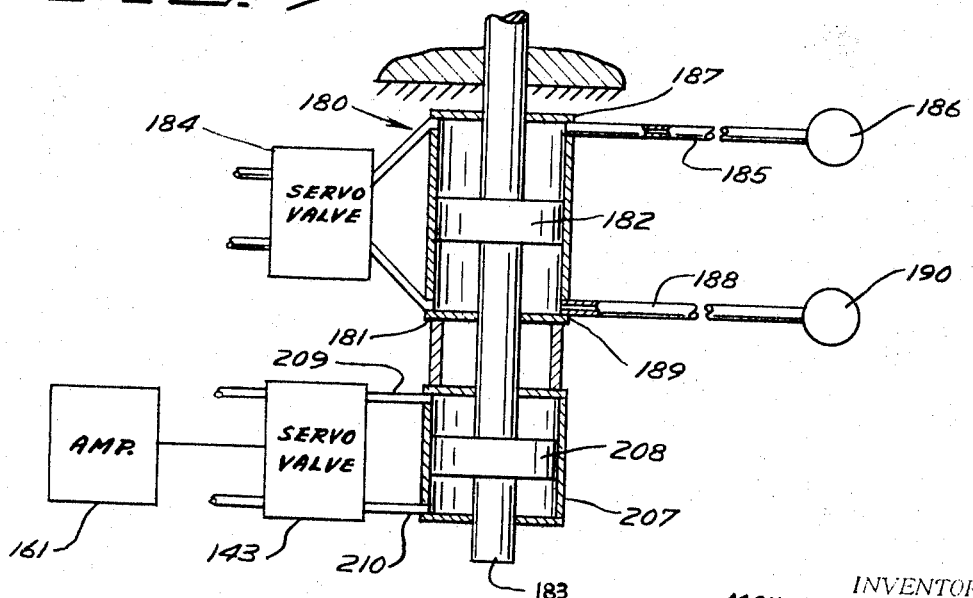

FIG. 7 is another modified form of the invention which is substantially the same as FIG. 5 with exception that the small actuator cylinder is also separated from the cylinder having the mass equivalent resonating fluid.

In FIG. 7, the cylinder 191 and piston 182 are attached to the rod 183 as explained in connection with FIG. 5. The resonating tubes 185 and 188 are open to the cylinder in opposite side sof the piston and the accumulators 186 and 190 are attached at the ends of the resonating tube. In this form of the invention, a mean load can still be applied through the piston 182 and cylinder 191 by operation of servo valve 184. Servo valve 184 will maintain a predetermined pressure differential on the piston and as the piston moves up and down during resonance, the moving fluid in the tubes 185 and 188 will give the equivalent mass action.

The exciter or actuator assembly is separated out from the cylinder in order to increase efficiency. An actuator cylinder 207 is mounted with respect to the frame, and a piston 208 is mounted inside the cylinder and is attached to the rod 183. A servo valve 211 which functions like valve 143 is open through conduits 209 and 210 to the interior of the cylinder 207 and the servo valve receives its signal from amplifier 161 which in turn is connected to a load cell in the system. The load cell provides signals to the servo valve 211 to compensate for any losses in the system and insures that the unit maintains resonance.

It should be mentioned that if desired, read out and recording equipment can be attached to the electronic circuitry so that an accurate record of the loads carried by the specimen can be obtained.

All forms of the invention utilize hydraulic actuators that are controlled by servo valves to supply sinusoidal hydraulic power to make up for the losses incurred during operation of resonant fatigue testing machines. The servo valves are controlled by presetting a desired load or amplitude and using a feedback signal from a load cell to insure that the desired amplitude is reached. The feedback signal also indicates the frequency of operation of the valve and the direction of force application. In both forms of the invention, mean or steady state loads can also be applied to the specimen. The amplitude of these loads can be controlled as well as using a preset load and a feedback signal to insure that the preset load is maintained.

In both forms of the invention resonance is obtained easily and can be started by actuating the servo-valve on the dynamic actuator a couple of times. The systems are unstable and will quickly slip into resonance. Then the automatic controls take over. To stop, the automatic controls are merely shut off, allowing the unit to damp out. A very rapid stop can be obtained by reversing the phase of the power input to the cylinder causing an absorption of the energy from the resonant system rather than adding energy from the resonant system.

In place of load control, the stroke or strain or other parameter that changes with the load on the specimen can be used for providing a signal for operation of the unit.

What is claimed is:

1. A fatigue testing machine for testing an elastic specimen comprising:
   a frame,
   means on the frame to support said specimen,
   means comprising an effective mass linked to said specimen, said effective mass being selected so that the overall specimen-mass system has a natural frequency within a desired range,
   a first hydraulic actuator operatively connected to said specimen and mass,
   a transducer delivering a signal proportional to the load on said specimen,
   a hydraulic servo valve controlling flow of hydraulic fluid under a pressure to and from said first hydraulic actuator,
   control means responsive to the signal from the transducer to cyclically actuate said servo valve at a frequency corresponding substantially to the natural frequency of said specimen-mass system,
   a second hydraulic actuator having a piston operatively connected to said specimen and mass, accumulator means open to one of said actuators to give said one actuator the properties of a soft spring, and means to maintain a load on said specimen through said second actuator.

2. The combination as specified in claim 1 wherein said control means and said means to maintain a load on said specimen comprise means to receive a signal from a load cell indicating the load actually placed on said specimen by said first and second actuators, the signal from said load cell comprising a single signal divided into a static component and a dynamic component, and second servo valve means actuated in response to a differential between the static component of the signal of the load cell and a preset signal to maintain said second actuator at a predetermined load level, said dynamic component on said signal controlling the first mentioned servo valve.

3. The testing machine of claim 1 further characterized in that the means comprising an effective mass linked to said specimen is comprised an elongated tube means open to said second actuator and filled with hydraulic fluid, said accumulator means being open to the outer end of said tube means, the cross-sectional length of said tube means being of size so that the hydraulic fluid therein will be accelerated in opposite directions upon cyclic movement of said specimen sufficiently to cause resonance of said specimen at a desired frequency.

4. The combination as specified in claim 1 wherein said effective mass is comprised as a hydraulic resonating system including a cylinder:
   a double-acting piston and rod in said cylinder, said rod being connected to said specimen and said cylinder being mounted to said frame,
   hollow tube means connected to said cylinder on each said of said piston and open to the interior of said cylinder on each side of said piston, said hollow tube means being filled with hydraulic fluid that moves upon movement of said piston, the cross-sectional area and length of said tube means being of size so that the hydraulic fluid therein will be accelerated upon cyclic movement of said piston sufficiently to cause resonance of said specimen at a frequency desired.

5. The combination as specified in claim 4 wherein said tube means comprises a single continuous tube with opposite ends thereof open to said cylinder on opposite sides of said piston, said cylinder tube being completely filled with hydraulic fluid.

6. For testing an elastic specimen, a fatigue testing machine system comprising:
   a frame,
   means on said frame to support said specimen,
   a load cell for measuring the load on said specimen and emitting an electrical signal proportional to the load thereon and at the frequency of load application thereon,
   a first hydraulic actuator linked to said specimen, said first hydraulic actuator including a cylinder and piston, said piston being movable with said specimen upon elastic movement thereof,
   a source of fluid under pressure,
   hollow tube means connected to said cylinder and open to the interior of said cylinder, said hollow tube means being filled with hydraulic fluid that moves upon movement of said piston in either direction, the cross-sectional area and length of said tube means being of size so that the hydraulic fluid therein will be accelerated in alternating directions upon cyclic movement of said piston sufficiently to cause resonance of said specimen at a frequency desired,
   control valve means to control pressure in said first actuator,
   a second hydraulic actuator including a piston connected for movement with said first actuator, a second servo valve for controlling flow of fluid under pressure to said second actuator,
   control means for said servo valve to cause said second valve to direct fluid under pressure to said second actuator at substantially the natural frequency of said specimen including means for receiving the electrical signals from said load cell and delivering an output signal to actuate said servo valve until the signal from said load cell equals a predetermined desired signal, and
   accumulator means open to said hollow tube means and operative to cause said first actuator to operate with the properties of a soft spring.

7. The combination as specified in claim 6 and means to adjust the phase of the power signal to the servo valve relative to the phase of the resonating specimen until the power supplied to the servo valve is at a minimum.

References Cited

UNITED STATES PATENTS

| | | | |
|---|---|---|---|
| 2,530,483 | 11/1950 | Russenberger | 73—92 |
| 3,187,565 | 6/1965 | Kreiskorte et al. | 73—67.3 |
| 3,304,768 | 2/1967 | Naumann et al. | 73—90 |

OTHER REFERENCES

Pelloux, Regis, M. N., Brooks, S. D.: Hydraulic Tension Compression Fatigue Machine, The Review of Scientific Instruments, vol. 35, Nov. 11, 1964, pp. 1564–1567.

Dickie, J. M.: Hydraulic Vibrators, Product Engineering Design, edition, December 1957, pp. 94–98.

MTS, TB 204.01–1, Series 204, Servo Ram, dated October 1964.

JAMES J. GILL, *Primary Examiner.*

JERRY W. MYRACLE, *Assistant Examiner.*

U.S. Cl. X.R.

73—67.3